July 8, 1952 — N. M. RUST ET AL — 2,602,920
RADIO LOCATION AND DETECTION ARRANGEMENT
Filed July 10, 1947
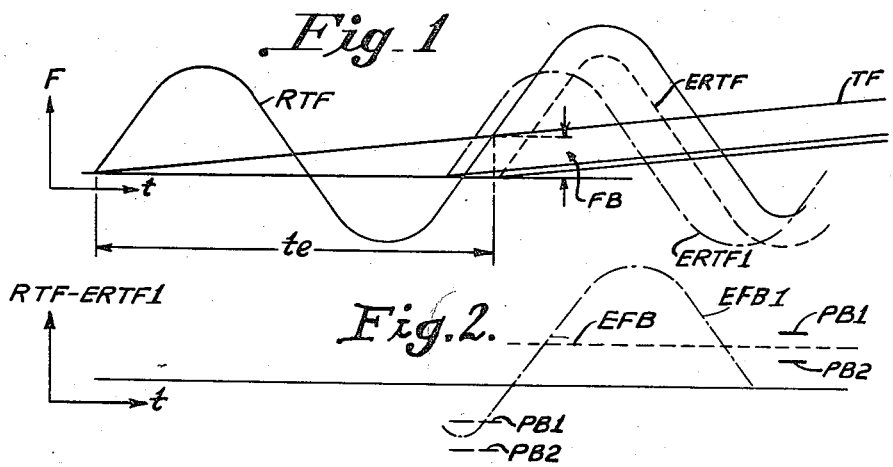
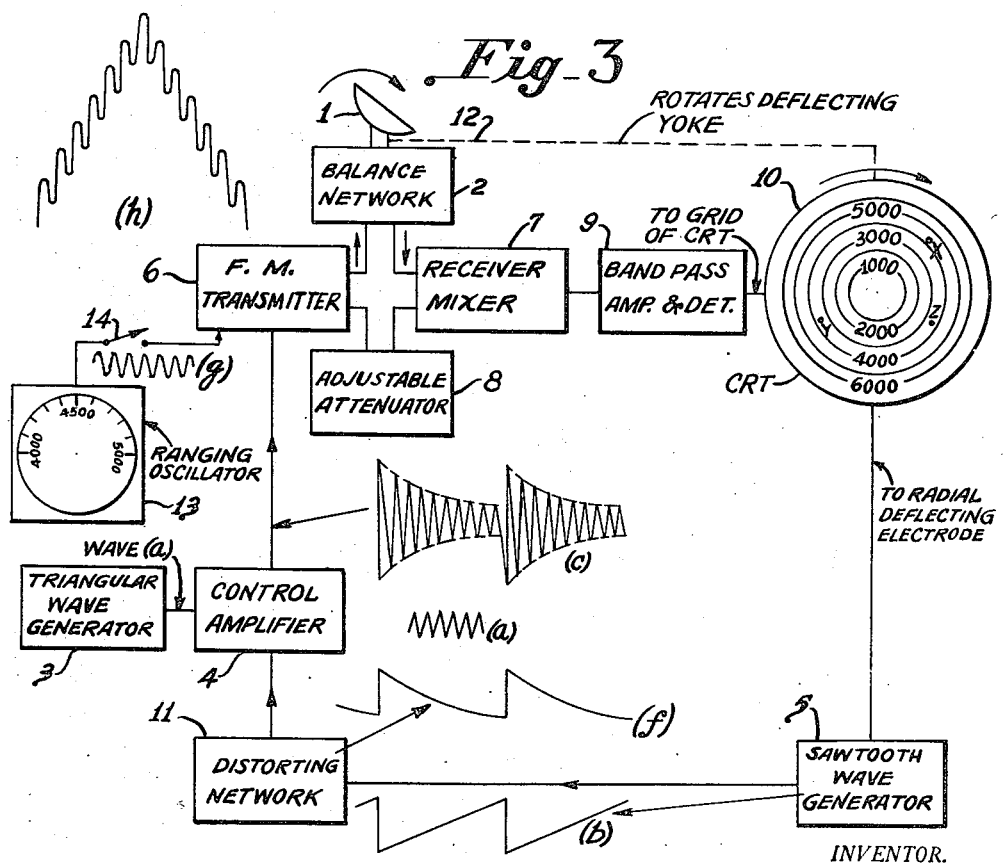
INVENTOR.
NOEL MEYER RUST AND
GEORGE EARNSHAW PARTINGTON
BY
ATTORNEY Patented July 8, 1952

2,602,920

UNITED STATES PATENT OFFICE 2,602,920

RADIO LOCATION AND DETECTION ARRANGEMENT

Noël Meyer Rust, Chelmsford, and George Earnshaw Partington, Langdale, England, assignors, by mesne assignments, to Radio Corporation of America, New York, N. Y., a corporation of Delaware Application July 10, 1947, Serial No. 760,098
In Great Britain August 27, 1945

Section 1, Public Law 690, August 8, 1946
Patent expires August 27, 1965

5 Claims. (Cl. 343—10)

This invention relates to radio location and detection arrangements i. e. to so-called radar systems, and has for its object to provide improved radar systems operating with continuous waves as distinct from wave pulses.

The radar systems which were widely used for military purposes during the World War of 1939–1945 and are now becoming generally known, were of the pulsed radar type. In a pulsed radar system a transmitter sends out, at a pre-determined pulse repetition frequency, a sequence of substantially rectangular pulses of fixed very high frequency energy. These pulses, after reflection from an aircraft or other radio reflecting object, are picked up by a suitable receiver and the range of the object determined by observing with the aid of a cathode ray tube and suitable associated circuits, the time taken by the radio energy to travel from the transmitting aerial to the object and thence back to the receiving aerial (commonly the same aerial as is employed for transmission). A pulsed radar system requires, however, the use of a receiver of wide acceptance band width and this involves that the receiver will also be responsive to a great deal of noise which would be rejected by a receiver of narrow acceptance band width. Moreover the generation, transmission and reception of wave pulses involves many technical difficulties resulting in circuit complexity and costly apparatus and limiting the mean power which can be employed to a value well below that which is possible, in otherwise similar circumstances, with a continuous wave transmission.

For the foregoing and other reasons the production of a radar system operating with continuous waves instead of wave pulses, and capable of giving a practical performance comparable with or better than that of the best pulsed radar systems is much to be desired. The earlier invention described in copending application Serial No. 452,990, filed July 31, 1942 in the name of Irving Wolff, now Patent No. 2,422,157, issued June 10, 1947, provides continuous wave radar systems capable of giving such performance and since the present invention takes the said invention as its starting point and provides improved continuous wave radar systems capable of giving extremely high range accuracy it will be convenient first to recapitulate the main features of said earlier invention in general terms.

The said earlier invention employs what may be termed frequency modulated continuous wave transmission, that is to say, the transmitted energy is not interrupted (as in a pulsed radar system) but is varied in frequency in a pre-determined manner over a pre-determined range of frequencies. Consider what occurs in a radar system utilizing such a form of transmitted energy. Suppose that, during the interval taken by a radio wave to travel from the transmitter to a target and thence back to the receiver the transmitted frequency has changed from a given value to a second different value. Then, at the instant when a portion of the transmitted wave is received, the transmitter will be emitting a different frequency and the difference between these two frequencies will be a measure of the range of the target. Therefore, if the receiver is arranged to receive, in addition to the reflected energy, a component of energy direct from the transmitter, there will be produced a beat frequency whose value depends on the range of the target and by measuring the beat frequency the range may be computed. It will be evident, however, that there are serious practical difficulties in the way of producing a radar system operating in this way and of performance comparable to that of a pulsed radar system, for the strength of a received signal will be an inverse function of its range and will depend also on the reflecting qualities of the target by which it is reflected. Any system depending on counting or discriminating the beat frequency signal produced will operate only if the said beat frequency signal is strong relative to any other signal which may be present at the same time at the counter or discriminator. If, therefore, there is a plurality of targets present at the same time, of which one gives rise to a strong echo signal (at the receiver) and others to only weak received signals, such a system will allow of the detection and ranging of the said one target but not of the others. The earlier Wolff invention above referred to avoids this difficulty and according to the said invention a radar system comprises means for transmitting continuous wave energy, means for varying the frequency of the transmitted energy, means for receiving reflected transmitted energy, means for combining reflected received energy with energy then being transmitted to produce beat frequency energy, frequency selective means for selecting among the beat frequencies produced between energy being transmitted and energy being received means for causing relative variation of the selected beat frequency and the rate of change of transmitted frequency in order to ascertain the range of a target reflecting the energy giving said selected beat energy.

Broadly speaking the said earlier Wolff invention may be carried into effect (a) by varying the rate of change of transmitted frequency and employing a fixed frequency selective circuit at the receiver (b) by keeping the rate of change of the transmitted frequency constant and varying the frequency to which the selective circuit at the receiver is responsive or (c) by varying both the rate of change of transmitted frequency and the selective frequency of the receiver circuit.

The basic principle utilized in the said Wolff invention is that the beat frequency produced by reflection from an object at a given range (R) i. e. having a given echo time, depends upon the rate of change of frequency $$\frac{dF}{dt}$$

and the range of a target giving an echo is ascertained by in effect observing the relationship between $$\frac{dF}{dt}$$

and the selected beat frequency. The present invention utilizes the same basic principle as is employed in the earlier Wolff invention referred to, but an additional factor is utilized for range indication enabling (as will be seen later) a considerably more accurate measurement of range to be made, and a considerably higher degree of range discrimination—i. e. ability to select among targets of closely similar range—to be achieved.

In the Wolff invention referred to variation of the rate of change of the transmitted frequency modulated wave, or variation of the selective frequency of the receiver, or both is effected at a rate which is slow relatively to the longest echo time to be dealt with so that the rate of change of transmitted frequency, or the selective frequency of the receiver (as the case may be) can be regarded as substantially constant over an echo time. According to this invention there is superimposed upon the variation of the rate of change of the transmitted frequency an additional periodic variation at a frequency (hereinafter termed the ranging frequency) having a periodic time of the same order as the echo time or an integral fraction thereof. This results in the very close selection of a target whose echo time is exactly equal to said periodic time and the rejection, by the receiver, of targets of quite closely similar range but whose echo time differs, albeit by quite small amounts, from said periodic time. If therefore, simultaneously with the variation of the rate of change of the transmitted frequency or the variation of the receiver selective frequency (as the case may be) there is provided an additional variation by a ranging frequency whose periodic time is automatically varied by a control wave as $$\frac{dF}{dt}$$

is varied or as the receiver selective frequency is varied (as the case may be) so that said periodic time is always equal to the echo time of a target whose reflected energy, when beaten with the transmitted energy, gives a beat which is in the middle of the acceptance band of the receiver, this beat will be passed by the receiver because it will be constant but other beats derived from reflected energy from closely adjacent targets (and which would lie within the acceptance band of, and be passed by, the receiver were there no ranging frequency) will not be passed by the receiver because they will not be constant. Instead of varying the ranging frequency automatically by a control wave, as above described, it may be varied manually. Thus a radar system in accordance with the earlier invention referred to may be provided with a manually adjustable ranging frequency oscillator which is arranged to be switched in when required, so that, after coarse ranging has been effected by a method in accordance with the said earlier invention, fine ranging may be effected by this invention.

The periodic component of variation whose periodic time is of the same order as the echo times of targets within the working range of the system or an integral fraction thereof, may be of any wave form so long as it is truly repetitive. Examples of possible wave forms are: rectangular, sawtooth, triangular, parabolic and sinusoidal while, if desired, complex wave forms e. g. a saw-tooth combined with a sinusoid of higher frequency or combined sinusoids of different frequencies (conveniently, though not necessarily in definite frequency relation) may be used. Indeed a completely irregular wave form may be used so long as it is exactly repetitive with a periodic time equal to the echo time or an integral fraction thereof, of the target to be selected.

The invention is illustrated in and further explained in connection with the accompanying drawings in which Figs. 1 and 2 are explanatory graphical figures and Fig. 3 is a block diagram showing one embodiment of the invention.

The principle of operation of the invention is graphically illustrated in Figs. 1 and 2. For the purpose of explanation it is assumed that the invention is applied to a radar system of the type described in the said Wolff application wherein the receiver selective circuit is of fixed frequency and the transmitter frequency is subjected to variation in accordance with a triangular control wave modulated in amplitude by a saw tooth wave of much lower frequency. It is also assumed that a number of closely adjacent targets have already been found by the said radar system and are displayed on the cathode ray tube screen thereof, it being desired to separate them and range accurately on one of them. Referring to Fig. 1 the straight line TF is a portion of the modulated triangular wave drawn to a large scale and is therefore a curve connecting transmitted frequency F with time $t$ during a rising portion of the triangular wave. In Fig. 1 the ordinates may also, of course, represent received echo frequency. In accordance with this invention the transmitter is also subjected to variation in accordance with a ranging frequency FR whose periodicity is of the same order as the echo time. This ranging frequency is represented as sinusoidal though this is not necessary and other wave shapes e. g. triangular may be employed. The result of the combined variation is the curve RTF, a sinusoidal curve whose mean value is the straight line TF. Consider what now occurs if the period of the ranging frequency is exactly equal to the echo time $t_e$ of a target. Such an echo, delayed by exactly one period of the ranging frequency, will be as represented by the broken line ERTF and it will be obvious that the beat note FB will be constant at a value dependent upon the slope of the curve TF. In other words the beat note will be dependent upon $$\frac{dF}{dt}$$

as though there were no ranging frequency present. This is illustrated by the horizontal line EFB in Fig. 2 in which produced beat frequency equal to RTF—ERTF1 is plotted against time $t$. This constant beat frequency falls in the middle of the receiver pass band the upper and lower limits of which are represented by the short horizontal line PB1 and PB2. If, however, the echo time is not exactly equal to the period of the ranging frequency the echo frequency-time curve will be, for example, as illustrated by the chain line ERTF1 in Fig. 1 which represents an echo from a target whose echo time is a little less than $t_e$. Whereas, were there no ranging frequency, such a target would give rise to a beat which would fall within the acceptance band of the receiver and be passed thereby the result of the ranging frequency is to cause the beat to vary the corresponding produced beat frequency-time curve being as shown by the curve EFB1 of Fig. 2. In this way discrimination between targets which are very close together in range may be effected and by determining range in terms of the ranging frequency it is possible readily to range to yards. Not the least of the advantages of the invention is the way in which, by its use, it is possible to present a ranged target clearly for so-called "clutter" is to a large extent eliminated.

It will be appreciated that a constant beat frequency will also be produced if the echo time is an exact multiple of the period of the ranging frequency. This, however cannot cause ambiguous indications, and the lack of correspondence between the range indicated on the display and that shown by the ranging oscillator immediately indicates that this has been done. If the approximate range is obtained from the display and then the ranging oscillator is adjusted about the corresponding "fundamental" position, this type of ambiguity cannot occur.

The apparatus necessary for the addition of the ranging frequency is very little and consists in essence, in the simplest case, merely of an adjustable oscillator, a resistance-capacity controlled oscillator is convenient because its calibration for range against condenser setting is easily made linear and it may readily be stabilized so that the calibrator remains accurate for long periods in ordinary working conditions.

The invention may be employed, for example, to determine more accurately the range of a single target already found by an apparatus in accordance with the earlier Wolff invention above referred to or to observe separately a number of targets which are too close together to be separated by apparatus in accordance with the said earlier invention. In the former case the approximate range of the target to be more accurately ranged is first obtained. The auxiliary oscillator—the ranging oscillator—is set to this range by coarse adjustment, and fine adjustment made until maximum response is obtained, from which the range is read. It is convenient when very precise measurements are required, after a preliminary adjustment with a small amount of ranging oscillation has been made, further to increase the control by the ranging oscillator thereby to sharpen the adjustment for maximum response, and at the same time to readjust the oscillator frequency for optimum conditions. An alternative method which affords very accurate results is to adjust the frequency on either side of maximum until two positions of zero response are obtained, the mean between these two positions giving the position of maximum, and hence the range. The greater the frequency swing from the auxiliary oscillator, the closer together on the range scale become these zero points and hence the more accurately is the range defined.

Now consider the effect that occurs when echo signals are received from two objects relatively near together, one giving a considerably stronger signal than the other, so that the display indication of the weaker is merged into the side of the stronger in such a manner that no positive information as to range can be obtained. Having approximately tuned the ranging oscillator to the weaker signal, the amount of control by it is increased with the result that the response from the strong signal is diminished, and at the same time by careful retuning, the response from the weaker signal can be brought to a maximum. A position is first arrived at in which the response due to the stronger signal can be brought to zero, leaving the weaker echo standing out clearly, and thus allowing a more accurate determination of the range.

The distinctive feature of the auxiliary or ranging frequency control method of the invention is that it is not primarily dependent upon the selectivity of the beat frequency tuning circuits, although a degree of selectivity is required in order to prevent spurious responses. The resolution, due to auxiliary control, is rather dependent upon the maximum frequency displacement and wave form of the control.

It is preferred, when scanning relatively near zones, where there are very strong reflections from relatively near objects which come within the range of distances being scanned, so to choose the rate-of-change of frequency, and the frequency to which the beat frequency selective circuit is tuned, that the beat frequency is never greater than half the frequency of the auxiliary ranging oscillator. This avoids spurious signals due to secondary sidebands generated by the interaction of the ranging oscillator with strong echoes.

Although it is frequently convenient to use sinusoidal wave form oscillations for the auxiliary control, as has been pointed out, maximum response for a given echo is given wherever the wave form of one oscillation is substantially repeated by the next oscillation and the periodic time is exactly equal to the echo time. Thus "peaky" sine waves, triangular waves, parabolic waves, etc., may be used, in some cases with definite advantage. The consideration that the wave form of successive oscillations must be substantially the same defines the necessary degree of linearity of the relation between controlling oscillation and controlled frequency.

The time taken to carry out a range scan is unaffected by the auxiliary control. It is thus possible to scan quickly in order to obtain information from a deep range of distances, with sufficient resolution to display objects in groups, and by introducing the auxiliary control to obtain a high degree of resolution on one particular group that is required to examine, without decreasing the scanning speed.

Fig. 3 shows in simplified block diagram form one embodiment of the invention adapted for P. P. I. display. In this figure a common transmitting and receiving directional aerial 1, adapted to give a sharply directive radio beam, is rotated or otherwise caused to sweep out a desired arc of search (as indicated by the arrow shown over the representation of said aerial) in any well known desired way. With the aerial is associated a suitable balance network arrangement 2 to allow the transmitter to energize the aerial with as little effect on the receiver as possible and to allow received signals to be fed to the receiver with as little loss as possible in the transmitter. A generator 3, producing a symmetrical triangular wave form of fixed frequency and amplitude feeds into a control amplifier 4 whose gain is controlled by a saw-tooth wave of much lower frequency than that of the triangular wave and which is generated by a saw-tooth wave generator 5, in conjunction with a distorting network 11 which transforms the straight saw tooth from generator 5 into a curved saw tooth. The triangular wave form is represented at (a) the straight saw tooth at (b) and the curved saw tooth at (f). The output from the amplifier 4 will therefore be as represented at (c) and will consist of a triangular wave of instantaneous amplitude proportional to the instantaneous curved saw tooth amplitude i. e. it will be a triangular wave modulated by a curved saw tooth wave. This modulated wave is therefore a voltage wave whose rate of change of voltage varied inversely with time in direct relation to the curved saw tooth wave, the rate of change being positive during the up-strokes of the triangle and negative during the down-strokes. Here, the very rapidly altering rate of change at the "points" of the curve i. e. where the rate of change alters from positive to negative or vice versa are ignored. The voltage wave (c) i. e. the control voltage wave is utilized in any suitable manner to control the frequency generated by a transmitter 6 so that said frequency is always as nearly as possible directly proportional to the control voltage wave amplitude. The rate of change of frequency of the transmitter i. e. the slope of the characteristic will therefore vary with the curved wave from a maximum at the beginning of a saw-tooth down stroke to a minimum at the end of said downstroke, then rising quickly to the maximum again.

The receiver-mixer 7 which can be advantageously of the balanced type receives not only echo signals picked up by aerial system 2 but also energy fed directly thereto from the transmitter 6 through a variable coupling, adjustable attenuator or equivalent device 8. This device serves to adjust the amplitude passed thereby to a value substantially bigger than that of the most powerful echo to be expected and suitable for efficient mixing without prejudicing the signal to noise ratio in the receiver mixer 7. The output from 7 will therefore consist of a series of beats due to different incoming echoes. The receiver-mixer 7 is followed by a band pass amplifier and detector 9 having an acceptance band of width B with a mid-band frequency JB. If the frequency transmitted at any time is F and the slope of the characteristic at that time is $$\frac{dF}{dt}$$

the unit 9 will produce an output when, and only when the echo time is so related to $$\frac{dF}{dt}$$

as to produce, between the echo signal and the frequency then being transmitted, a beat lying within the band of frequencies $$JB \pm \frac{B}{2}$$

The output from unit 9 is fed, to control the intensity of the cathode ray in a cathode ray tube 10 so that a spot of light is produced on the screen of the tube only in response to an appreciable output from 9. Radial deflection in the tube 10 is produced by the wave (b) which is applied from generator 5 to a radial deflecting electrode of the tube. If an echo gives rise to an output from 9 sufficient to brighten the ray to produce a spot on the screen of the tube 10, the radial distance of said spot from the center of the screen will be linearly proportional to the range. Circular or rotary deflection is produced in the tube 10 in accordance with well known P. P. I. display practice, this deflection being indicated by the arrow shown above the tube and being, of course, synchronized with the search scanning of the aerial 1 as represented by the broken line 12 so that the radial direction of a spot on the screen (from the center) indicates target azimuth.

As so far described the system of Fig. 3 is in accordance with the invention described in said Wolff application except that a common aerial system is employed and the cathode ray display is of the P. P. I. type instead of like an "A" display. In accordance with the present invention, however, there is provided an auxiliary or ranging oscillator 13 which can be switched in when desired by closing a switch 14. The oscillator 13 is variable in frequency between a value at which the period time is equal to the shortest echo time required to be accurately ranged and a value at which the periodic time is equal to the longest echo time required to be ranged. The frequency control handle may be arranged to be moved over a scale marked directly in ranges and in Fig. 3 the zone of ranges indicated is from 4000 to 5000 yards. The output from generator 13 is represented at (g) this wave form, like the other wave forms shown, being, of course, purely illustrative and not intended to be to scale in any way. The wave form (g) is used to provide additional frequency control of the transmitter 6 so that, when switch 14 is closed, the transmitted frequency varies in accordance with a control wave as represented at (h). It will be appreciated that (h) corresponds to one half-wave i. e. two successive half-strokes (one up and one down) of the wave form (c) with the wave form (g) superimposed. Suppose, before switch 14 is closed, three target spots XYZ appear on the screen 10 (which may be marked with range rings as in the usual way) at closely similar ranges between 4000 and 5000 yards. Incidentally, if these spots were from targets with the same azimuth, i. e. aircraft cruising in station on one another, they would probably appear as one spot only. By switching in the ranging oscillator 13 and adjusting it until its periodic time exactly equals the echo time of one target, say that giving spot X, the other spots may be caused to disappear and the range of the chosen target very accurately determined by reading the adjustment scale of the oscillator.

Fig. 3 describes a system in which the invention is employed to give accurate ranging in a narrow zone of ranges forming part of a wider zone which is searched by apparatus in accordance with the said Wolff application. The present invention, however, is not limited to the specific system described in the Wolff application and can be applied to any system of that type, e. g. with manual operation in searching over restricted ranges in cases where it is required to "spot light" a small area in order to obtain maximum possible signal to noise ratio from the echo. Aural or meter methods of indicating signals may prove convenient for restricted and concentrated searching. To facilitate adjustment it may be preferable to gang together the two important adjustments, i. e. in the specific system described in said Wolff application the control of the rate of change of frequency and of the ranging oscillator frequency, or in a system using selective circuit tuning, the control of the selective circuit tuning and that of the ranging oscillator, suitable arrangements, mechanical or electrical being provided to keep them in track in each case. It is preferable to provide separate adjustments for the control of the selectivity of the beat frequency circuit and of the degree of control of the ranging oscillator upon the transmitter frequency, thus providing a means of adjusting and combining the two forms of selectivity. In many cases it will be possible to omit the control on the selectivity of the beat frequency circuit, or to use only coarse steps in its control, the control of the ranging oscillator being used as a convenient means of smoothly increasing the selectivity, or the resolution up to the practical limit.

Again it will be obvious that by mechanical or electrical means the ganged system may be rapidly varied, and the response made to actuate a visual display unit, in which the resolution for the whole scan is increased as the ranging oscillator control is increased—it should be clearly understood, however, that the time taken to effect each scan becomes longer the greater the resolution, in this case, as the increased resolution is being employed over the complete scan, instead of for one distance only as heretofore described. Again, in a system in accordance with either of the above mentioned specifications and wherein range scanning is effected over a limited zone of ranges by a control wave, the same wave may be utilized to control the frequency of the ranging oscillator e. g. by any electronic control system well known per se.

In a system in accordance with this invention wherein sudden changes in the transmitted frequency or in the rate of change of transmitted frequency, are made, it may be of advantage in many cases to provide means for suppressing the transmitter radiation for a short period extending from shortly before to shortly after each such change.

Although, in the preceding description, reference is made throughout to the mixing of the transmitted continuous wave with the received echo energy, it will be obvious to those skilled in the art, that instead of mixing these actual waves it is an equivalent, so far as the present invention is concerned if the mean frequency of either of them be changed before mixing, by means of a local oscillator and beat frequency circuit in the ordinary well known way, the frequency selective receiver circuit being, of course, arranged, in such a case, to suit the echo beat frequency produced by mixing the changed transmitter or echo frequency with the other frequency. In practice, design advantage is to be obtained by thus changing one of the frequencies to be mixed before mixing them for, by suitable choice of the local oscillator frequency it is possible to make the beat note produced larger than the total frequency survey caused by the periodic component of variation provided in accordance with this invention. A similar result may be obtained by suitable choice of the relatively long period linear control wave.

We claim as our invention:

1. A radar system comprising means for transmitting continuous wave energy, means for varying the frequency of the transmitted energy, means for receiving reflected transmitted energy, means for combining reflected received energy with energy then being transmitted to produce beat frequency energy, frequency selective means for selecting among the beat frequencies produced between energy being transmitted and energy being received, means for causing relative variation of the selected beat frequency and the rate of change of transmitted frequency and means for additionally varying the transmitted frequency in accordance with a wave of adjustable frequency and whose periodic time may be adjusted to be equal to the echo time or to an integral fraction of the echo time of a target reflecting energy giving said selected beat energy.

2. A radar system comprising means for transmitting continuous wave energy, means for varying the frequency of the transmitted energy, means for varying in a pre-determined manner the rate of change of said frequency variation, means for receiving reflected transmitted energy, means for combining reflected received energy with energy then being transmitted to produce beat energy of frequency dependent upon the rate of change of the transmitted frequency and upon the echo time, fixed frequency selective means for accepting only a band of beat frequency energy with a pre-determined mid-frequency, indicator means actuated by energy passed by said frequency selective means and means for additionally varying the transmitted frequency in accordance with a wave of adjustable frequency and whose periodic time may be adjusted to be equal to the echo time or an integral fraction of the echo time of a target reflecting energy giving said selected beat energy.

3. A system as claimed in claim 1 wherein manual adjustment means is provided to produce equality of said periodic time with echo time or an integral fraction thereof.

4. A distance measuring system which comprises means for transmitting continuous wave energy, means for cyclically varying the frequency of the transmitted energy, means for receiving reflected transmitted energy, means for combining reflected received energy with energy then being transmitted to produce beat frequency energy, means for selecting a beat frequency from among the beat frequencies produced between energy being transmitted and energy being received, means for producing relative variation of the selected beat frequency and the rate of change of the transmitted frequency, and means for additionally varying the transmitted frequency in accordance with a wave of adjustable frequency whose periodic time is adjusted to be equal to the echo time or to an integral fraction of the echo time of the target reflecting energy giving said selected beat energy.

5. A system for measuring distance which comprises means for radiating a radio wave toward a reflecting object, means for cyclically frequency modulating said wave to cause its frequency to change cyclically in a predetermined way with respect to time, means for receiving the wave after reflection from said object and heterodyning it with a portion of said modulated wave which has not been reflected whereby a signal having a beat or difference frequency is produced, means for periodically varying the rate of said frequency change and means for synchronously varying the position of an index marking means with respect to a distance scale, means for additionally varying the transmitted frequency in accordance with a wave of adjustable frequency whose periodic time is adjusted to be equal to the echoed time or to an integral fraction of the echoed time of the target reflecting energy giving said selected periodic energy, and means for producing an indication at said index marking means only in response to the frequency of said signal reaching a predetermined beat frequency value.

NOËL MEYER RUST.
GEORGE EARNSHAW PARTINGTON.

REFERENCES CITED

The following references are of record in the file of this patent:

UNITED STATES PATENTS

| Number | Name | Date |
|---|---|---|
| 2,236,893 | Chaffee | Apr. 1, 1941 |
| 2,436,627 | Blitz | Feb. 24, 1948 |
| 2,505,692 | Staal | Apr. 26, 1950 |

FOREIGN PATENTS

| Number | Country | Date |
|---|---|---|
| 897,437 | France | May 22, 1944 |